United States Patent [19]

Raia

[11] Patent Number: 4,945,672
[45] Date of Patent: Aug. 7, 1990

[54] WATER CIRCULATING AND AERATING DEVICE FOR LIVE BAIT CONTAINERS

[76] Inventor: John A. Raia, 2102 Seamist Ct., Houston, Tex. 77008

[21] Appl. No.: 265,894

[22] Filed: Nov. 2, 1988

[51] Int. Cl.⁵ .................................... A01K 97/00
[52] U.S. Cl. .................................. 43/57; 43/55; 261/121.2
[58] Field of Search .............. 43/55, 56, 57; 119/3, 119/5; 261/121.2

[56] References Cited

U.S. PATENT DOCUMENTS

| | | | |
|---|---|---|---|
| 2,639,906 | 5/1953 | Butler | 43/57 |
| 2,674,574 | 4/1954 | Pettas | 261/121.2 |
| 2,923,087 | 2/1960 | Cummings | 43/55 |
| 3,217,444 | 11/1965 | Howard | 43/57 |
| 3,509,657 | 5/1970 | Bross | 43/57 |
| 3,800,462 | 4/1974 | Coyle | 43/57 |
| 3,822,498 | 7/1974 | Butler | 43/57 |
| 4,074,651 | 2/1978 | Arduser | 43/57 |
| 4,168,590 | 9/1979 | Beshoner | 43/55 |
| 4,748,765 | 6/1988 | Martin | 43/55 |
| 4,766,691 | 8/1988 | Lynn | 43/55 |

*Primary Examiner*—Kurt Rowan
*Attorney, Agent, or Firm*—Neal J. Mosely

[57] ABSTRACT

A water circulation and aerating device for live bait containers comprises a housing removably installed in existing bait containers which has apertures in the lower portion to prevent live bait from passing therethrough while allowing passage of water into the housing when the water level within the bait container rises. An intake conduit extends through the upper portion of the housing and has one end extending into the water in the bait container and a hose at the other end extending remote from the housing and a distance beneath the surface of the body of water being fished. An exterior pump at the remote end of the intake hose pumps cool water from beneath the surface of the body of water into the bait container. A venturi tube on the intake conduit mixes air into the water being pumped into the bait container. An interior pump within the housing becomes operative upon the water entering the housing reaching a predetermined level to pump the water back into the body of water being fished. Thus, the water introduced into the bait container is the same temperature as the body of water being fished and is aerated with fresh air and the warmer water discharged from the bait container will also contain metabolic wastes and nitrates created by the concentrated population.

20 Claims, 2 Drawing Sheets

WATER CIRCULATING AND AERATING DEVICE FOR LIVE BAIT CONTAINERS

BACKGROUND OF THE INVENTION

1. FIELD OF THE INVENTION

This invention relates generally to water circulating and aerating devices, and more particularly to a water circulating and aerating device placed inside existing bait containers which utilizes separate inside and outside pumps to provide the same natural water environment for the bait as the body of water in which it lives.

2. BRIEF DESCRIPTION OF THE PRIOR ART

Keeping live bait such as minnows, shrimp, smaller fish, and other delicate marine life alive is a common problem for fishermen. Once removed from their environment and placed in a container, the live bait generally requires three things for their survival. These are the liquid of their natural fresh or salt water habitat, oxygen, and temperature control. Because the water which houses the bait will build up nitrates and metabolic wastes from the concentrated population, it is also desirable to change or circulate the bait water periodically.

Many devices have been provided which have attempted to increase the survival of live bait for extended periods of time. Simple forms of bait buckets and bait wells provide only a container filled with water. More advanced bait buckets provide water aeration by means of a pump which pumps air into the container or by recirculating the water in the container through various spray head devices. There are several patents which disclose various devices which attempt to solve the problems of the prior art.

Butler, U.S. Pat. No. 2,936,542 discloses a complete, self contained, aerated bait box which utilizes a scoop which circulates fresh water from the lake or stream in which the boat is traveling into the container through a spray head without the use of any motor or external force when the boat is in motion, and has a cylinder of compressed air or liquid to release the contents into the bait water to agitate and refreshen the water when fresh water is not available.

Richards, U.S. Pat. No. 3,040,469 discloses a minnow pail water changer using a venturi-suction device which continuously changes the water when the boat is in motion.

Artin, U.S. Pat. No. 3,499,243 discloses a minnow bucket irrigating valve which allows for the free flow of water into and out of the bait container when placed in a boat.

Lewis, Jr., U.S. Pat. No. 3,797,160 discloses a self flushing live bait container for power boats comprising a scoop and an apertured container slidably mounted on the boat hull whereby the scoop circulates fresh water from the lake or stream in which the boat is traveling into the container when the boat is in motion, and when the boat is not in motion, the container is slid downward to submerge its lower portion in the water below the bottom of the boat.

Arduser, U.S. Pat. No. 4,074,651 discloses a forced aerating mechanism for live bait wells on fishing boats which uses the motion through the water to force circulation. The device includes a live well with a water pipe in the boat having a discharge end positioned adjacent the well and an intake end outside the boat beneath the water line. A pump in the pipe pumps water from outside the boat through an aerating spray bar on the discharge end. A bypass pipe allows water to bypass the pump when the boat is in motion.

Beshoner, U.S. Pat. No. 4,168,590 discloses a forced aerating device which can be placed in a live bait container such as an ice chest. The device comprises an apertured baffle which fits in the container and divides it into a bait holding section and a pumping section. A pump submersed in the pumping section pumps water contained in the chest through an aerating sparge to spray water back into the bait holding section.

Martin, U.S. Pat. No. 4,748,765 discloses a forced aerating apparatus for live bait wells on fishing boats which draws water from the live well and conveys it through a separate tank for heat exchange and then back into the live well through a spray head to aerate and cool the water below the temperature of the natural bait habitat to induce a state of slowed metabolism.

The present invention is distinguished over the prior art in general, and these patents in particular by a water circulation and aerating device for live bait containers comprising a housing removably installed in existing bait containers which has apertures in the lower portion to prevent live bait from passing therethrough while allowing passage of water into the housing when the water level within the bait container rises. An intake conduit extends through the upper portion of the housing and has one end extending into the water in the bait container and a hose at the other end extending remote from the housing and a distance beneath the surface of the body of water being fished. An exterior pump at the remote end of the intake hose pumps cool water from beneath the surface of the body of water into the bait container. A venturi tube on the intake conduit mixes air into the water being pumped into the bait container. An interior pump within the housing becomes operative upon the water entering the housing reaching a predetermined level to pump the water back into the body of water being fished. Thus, the water introduced into the bait container is the same temperature as the body of water being fished and is aerated with fresh air and the warmer water discharged from the bait container will also contain metabolic wastes and nitrates created by the concentrated population.

SUMMARY OF THE INVENTION

It is therefore an object of the present invention to provide a water circulating and aerating device which is easily and quickly installed and removed from inside existing live bait containers without permanent attachment.

It is another object of this invention to provide a water circulating and aerating device for live bait containers which utilizes separate inside and outside pumps to provide the same natural water environment for the bait as the body of water in which it lives.

Another object of this invention is to provide a water circulating and aerating device for live bait containers which provides the bait container with aerated natural water from the body of water in which the bait lives.

Another object of this invention is to provide a water circulating and aerating device for live bait containers which provides the bait container with cool aerated natural water from beneath the surface the body of water in which the bait lives.

A further object of this invention is to provide a water circulating and aerating device for live bait containers which removes warm water containing metabolic wastes and nitrates from the bait container.

A still further object of this invention is to provide a water circulating and aerating device for live bait containers which is simple in construction, economical to manufacture, and rugged and reliable in use.

Other objects of the invention will become apparent from time to time throughout the specification and claims as hereinafter related.

The above noted objects and other objects of the invention are accomplished by a water circulation and aerating device for live bait containers comprising a housing removably installed in existing bait containers which has apertures in the lower portion to prevent live bait from passing therethrough while allowing passage of water into the housing when the water level within the bait container rises. An intake conduit extends through the upper portion of the housing and has one end extending into the water in the bait container and a hose at the other end extending remote from the housing and a distance beneath the surface of the body of water being fished. An exterior pump at the remote end of the intake hose pumps cool water from beneath the surface of the body of water into the bait container. A venturi tube on the intake conduit mixes air into the water being pumped into the bait container. An interior pump within the housing becomes operative upon the water entering the housing reaching a predetermined level to pump the water back into the body of water being fished. Thus, the water introduced into the bait container is the same temperature as the body of water being fished and is aerated with fresh air and the warmer water discharged from the bait container will also contain metabolic wastes and nitrates created by the concentrated population.

DESCRIPTION OF THE PREFERRED EMBODIMENT

Figure 1:
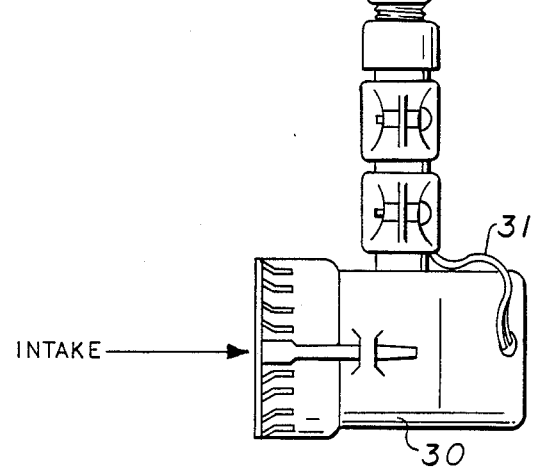
FIG. 1 is an illustration of the water circulating and aerating device installed in a bait container in a boat.
Figure 1:
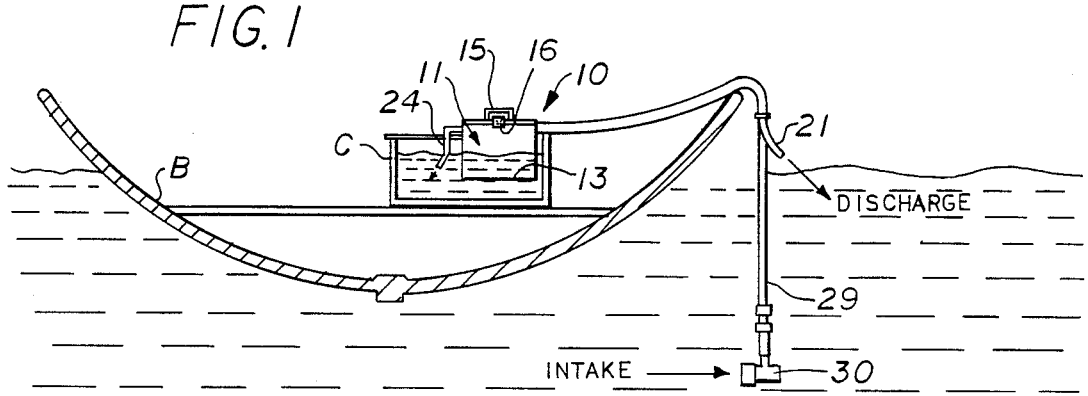

Referring to the drawings by numerals of reference, there is shown in FIG. 1, a preferred water circulation and aerating device 10 installed in a live bait container C carried in a boat B.

Figure 2:
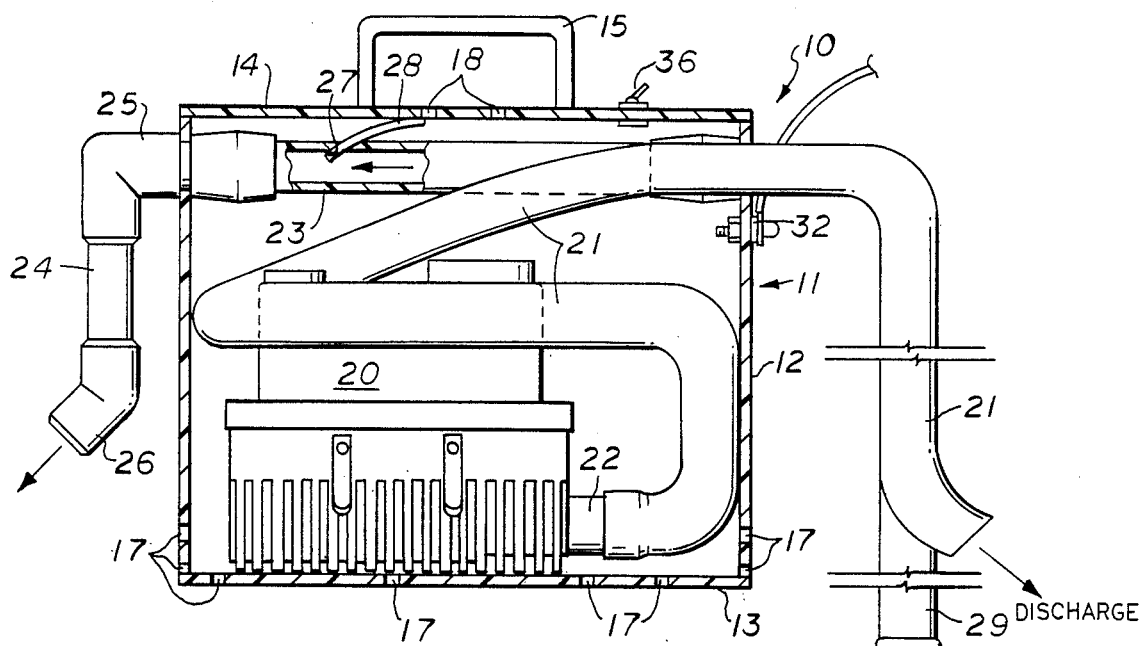
FIG. 2 is a side elevation in partial cross section of the water circulating and aerating device.
Figure 3:
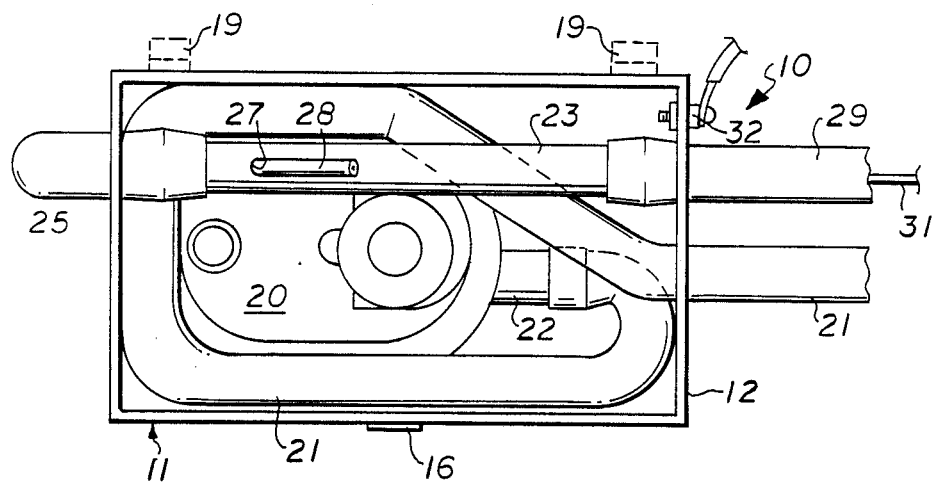
FIG. 3 is a top plan view of the water circulating and aerating device.
Figure 4:
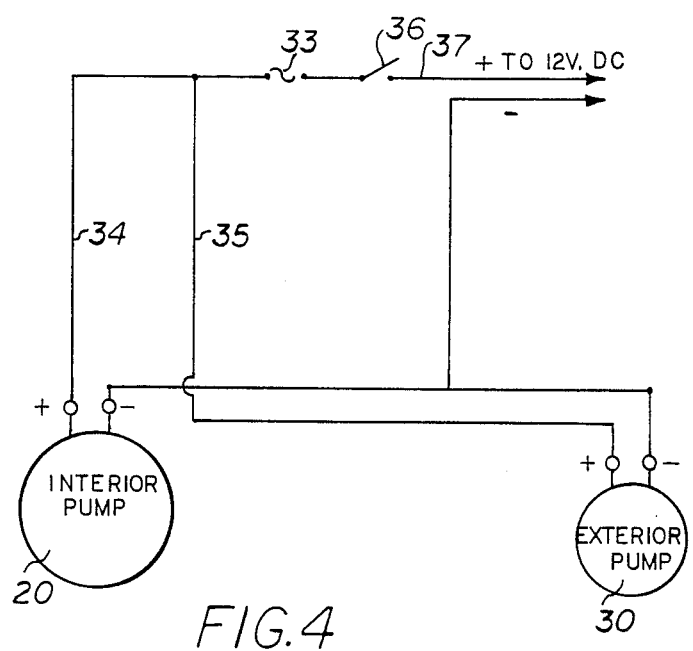
FIG. 4 is an electrical schematic top plan view of the water circulating and aerating device.

Referring additionally to FIGS. 2, 3, and 4, the device 10 comprises a box-like housing 11 formed of plastic or other suitable water resistant material having a continuous side wall 12 enclosed by a bottom wall 13 and a lid 14 at the top secured to the side wall by a hinge (not shown). The hinged lid 14 has a handle 15 secured on its top surface and a latch member 16 releasably secures the lid to the side wall 12.

A plurality of holes 17 are formed in the lower portion of the side wall 12 and the bottom wall 13 allowing water to flow into the interior of the housing 11 but of sufficient size to prevent bait from passing therethrough. Holes 18 may also be formed in the lid 14 for allowing air to enter the housing 11. Clips or brackets 19 may be installed on the side wall exterior to allow the housing 11 to be removably mounted on the side wall of conventional bait containers C.

An interior, automatic 12 V DC bilge pump 20 (with an interior automatic float switch, not shown, for activation) is mounted inside the housing Il. A flexible discharge hose 21 having one end connected to the outlet 22 of the automatic pump 20 extends through the housing side wall 12 and terminates a distance outside the housing.

A length of conduit 23 extends horizontally across the top portion of the housing 11 through opposing sides. The ends of the conduit 23 terminate a short distance outside the housing 11 and are sealed by conventional means where they pass through the side wall 12. Another length of conduit 24 extends vertically along one side of the housing exterior and is connected at its top end to one end of the horizontal conduit 23 by a 90° ell 25. The other end of the vertical conduit 24 is bent angularly outward from the housing 11 or may have an elbow fitting 26 installed thereon to direct water passing therethrough away from the holes 17 in the housing 11.

A hole 27 extends angularly through the side wall and into the interior of the horizontal conduit 23 and receives one end of a short relatively small diameter flexible tube 28. The hole 27 slopes inward in the downstream direction to create a venturi effect sufficient to pull air through the tube 28 into the water flowing through the conduit 23.

A flexible intake hose 29 has one end connected to the other end of the horizontal conduit 23 extending through the housing side wall 12 and extends a distance from the housing 11. The outer end of the intake hose 29 is connected to the outlet of an exterior pump 30. The wires or leads 31 of the exterior pump 30 are water sealed in a protective sheath and extend from the pump 30 through the interior of the intake hose 29 to exit inside the housing interior.

A pair of electrical connectors 32 may be provided through the exterior of the housing 11 to facilitate connection of the housing to the positive and negative terminals of a 12 V DC battery. The housing 11 may also be provided with a pair of wire leads extending from the housing or connectors and having clips (not shown) at the ends for connecting the housing to a 12 V DC source to facilitate installation.

As shown in FIG. 4, the positive terminal of the battery is connected through a 3 amp fuse 33 to the motor of each pump 20 and 30 through leads 34 and 35. An on-of switch 36 may be provided on the exterior of the housing 11 and connected in the lead 37 supplying current to the pumps to control their operation.

The housing 11 is sufficiently small to contain the above described components and fits within most conventional bait containers the user chooses. The intake hose 29 with the exterior pump 30 on the end is sufficiently long to extend from the housing and into the body of water a depth of approximately 3 feet below the water surface. The discharge hose 21 is sufficiently long to extend from the housing 11 to the surface of the water or over the side of a conventional fishing boat. The hoses 21 and 29 may be secured together along their length for ease of handling.

OPERATION

To use the water circulating and aerating device 10, the user places the device into the bait tank or bait well and drops the intake and discharge hoses 21 and 29 over the side of the boat into the water. The bottom wall 13 of the housing 11 will reside above the bottom of the bait container C. The exterior pump 30 at the end of the intake hose 29, when properly placed, will reside approximately 3 feet below the water surface, beneath the sun heated upper portion of the water.

The bait container C is filled with natural water from the body of water which is being fished to a level just below the bottom surface of the housing 11. The leads are connected to the battery and the exterior pump 30 will begin to operate immediately, or when the on-off switch 36 is turned on if one is provided.

The exterior pump 30 conducts natural water into the interior of the bait container C through the hose 29 and conduits 23 and 24 and creates a venturi effect sufficient to pull air through the tube 28 and mix it with water flowing through the conduit 23. The water thus introduced into the bait container C is the same temperature as the body of water being fished and is aerated with fresh air.

When the water in the bait container C rises to a predetermined level, it will enter the interior of the housing 11 and the interior pump 20 inside the housing will automatically be activated by its float switch to draw the water from the bait container C and discharge it over the side of the boat through the discharge hose 21. The warm water discharged from the bait container will also contain metabolic wastes and nitrates created by the concentrated population.

The interior and exterior pumps may be selected to have different flow rates such that the interior pump will only be operating intermittently to preserve battery life. Also, depending upon the height of the bait container relative to the free end of the discharge hose, a siphon effect may take place which causes the water to drain out without the interior pump (discharge) being in operation. This will also result in intermittent operation of the pump and further saving of battery live.

While this invention has been described fully and completely with special emphasis upon a preferred embodiment, it should be understood that within the scope of the appended claims the invention may be practiced otherwise than as specifically described herein.

I claim:

1. A water circulation and aerating device for live bait containers comprising:
   a housing formed of water resistant material having a continuous side wall enclosed by a bottom wall and a top wall and adapted to be removably mounted in the upper portion of a live bait container and apertured to prevent live bait from passing therethrough while allowing passage of liquid into said housing upon the level of liquid rising within the bait container,
   means to introduce water from the body of water being fished into the bait container in which said housing is to be positioned,
   aerating means for mixing air into the water being pumped into the bait container,
   pump means in the interior of said housing for pumping liquid therefrom,
   means operatively connected to said pump means for discharging the liquid pumped from said housing interior to a location remote from said housing.

2. A water circulation and aerating device according to claim 1 in which
   said aerating means comprises a venturi tube in said intake conduit means of sufficient size to pull air through the tube and mix it into liquid flowing through said water introducing means.

3. A water circulation and aerating device according to claim 1 in which
   said housing top wall has handle means for lifting said housing in and out of the bait container.

4. A water circulation and aerating device according to claim 1 in which
   said discharge means comprises a length of flexible discharge hose having one end connected to an outlet of said interior pump means and its other end terminating a distance outside said housing.

5. A water circulation and aerating device according to claim 1 in which
   said water introducing means comprises a length of tubular conduit having a first portion extending through the interior upper portion of said housing with a first end extending through the side wall and a second end extending through the side wall and vertically outside said housing and into the bait container and terminating in an angular portion extending outwardly away from said housing, and
   a length of flexible intake hose having one end connected to the first end of said tubular conduit and its other end operable to extend to a distance remote from said housing,
   said flexible intake hose of sufficient length to allow its intake end to reside a predetermined distance beneath the surface of the body of water being fished.

6. A water circulation and aerating device according to claim 5 in which
   said aerating means comprises a venturi tube installed in said tubular conduit of sufficient size to pull air through the tube and mix it into liquid flowing therethrough.

7. A water circulation and aerating device for live bait containers comprising;
   a housing formed of water resistant material having a continuous side wall enclosed by a bottom wall and a top wall and adapted to be removably mounted in the upper portion of a live bait container,
   apertures in the lower portion of said housing of sufficient size to prevent live bait from passing therethrough while allowing passage of liquid into said housing upon the level of liquid rising within the bait container,
   intake conduit means extending through the upper portion of said housing and having one end extending into the liquid in the bait container and another end extending remote from said housing and beneath the surface of the body of water being fished,
   exterior electric pump means at the remote end of said intake conduit means and adapted to be connected to a source of electrical current for pumping liquid from beneath the surface of the body of water into the bait container,
   aerating means on the portion of said intake conduit means passing through said housing for mixing air into the liquid being pumped into the bait container,
   interior electric pump means within said housing at the bottom portion thereof adapted to be connected to a source of electrical current and operative upon the liquid within said housing reaching a predetermined level to pump liquid from said housing, and discharge conduit means connected to said interior pump means for discharging the liquid pumped from said housing interior to a location remote from said housing.

8. A water circulation and aerating device according to claim 7 in which
said interior pump means has a flow rate sufficiently different from the flow rate of said exterior pump to cause it to operate intermittently.

9. A water circulation and aerating device according to claim 7 in which
said aerating means comprises a venturi tube in said intake conduit means of sufficient size to pull air through the tube and mix it into liquid flowing through said intake conduit means.

10. A water circulation and aerating device according to claim 7 in which
said housing top wall is hinged to said side wall for gaining access to said internal pump means and provided with latch means opposite the hinge to releasably secure the top wall to the side wall.

11. A water circulation and aerating device according to claim 7 in which
said housing top wall has handle means for lifting said housing in and out of the bait container.

12. A water circulation and aerating device according to claim 7 in which
said interior pump means comprises an electric bilge pump mounted in said housing at the lower portion thereof.

13. A water circulation and aerating device according to claim 7 in which
said discharge conduit means comprises a length of flexible discharge hose having one end connected to an outlet of said interior pump means and its other end terminating a distance outside said housing.

14. A water circulation and aerating device according to claim 7 in which
said discharge conduit means comprises a length of flexible discharge hose having one end connected to the outlet of said interior pump means and its other end terminating a distance outside said housing.

15. A water circulation and aerating device according to claim 7 in which
said intake conduit means comprises a length of tubular conduit having a horizontal portion extending through the interior upper portion of said housing with a first end extending through the side wall and a second end extending through the side wall and vertically outside said housing and into the bait container and terminating in an angular portion extending outwardly away from said housing, and
a length of flexible intake hose having one end connected to the first end of said tubular conduit and its other end connected to said external pump means a distance remote from said housing,
said flexible intake hose of sufficient length to allow said external pump means to reside a distance beneath the surface of the body of water being fished.

16. A water circulation and aerating device according to claim 15 in which
said aerating means comprises a venturi tube installed in said tubular conduit of sufficient size to pull air through the tube and mix it into liquid flowing through said intake conduit means.

17. A water circulation and aerating device according to claim 15 in which
said exterior pump at the remote end of said flexible intake hose is connected to a source of electrical current by wires water sealed in a protective sheath which extends substantially through the interior of the intake hose from said pump to the interior of said housing.

18. A water circulation and aerating device according to claim 7 including
electrical connectors on said housing operatively connected to said interior and exterior pump means for connecting said housing to the terminals of a battery for supplying electrical current to said interior and exterior pump means.

19. A water circulation and aerating device according to claim 18 including
electrical circuitry within said housing to control the operation of said interior and exterior pump means.

20. A water circulation and aerating device according to claim 18 including
electrical cables extending from said electrical connectors and provided with battery clips for connecting said housing to a battery.

* * * * *